J. F. O'CONNOR.
SHOCK ABSORBING MECHANISM.
APPLICATION FILED SEPT. 30, 1918.
1,407,882.
Patented Feb. 28, 1922.
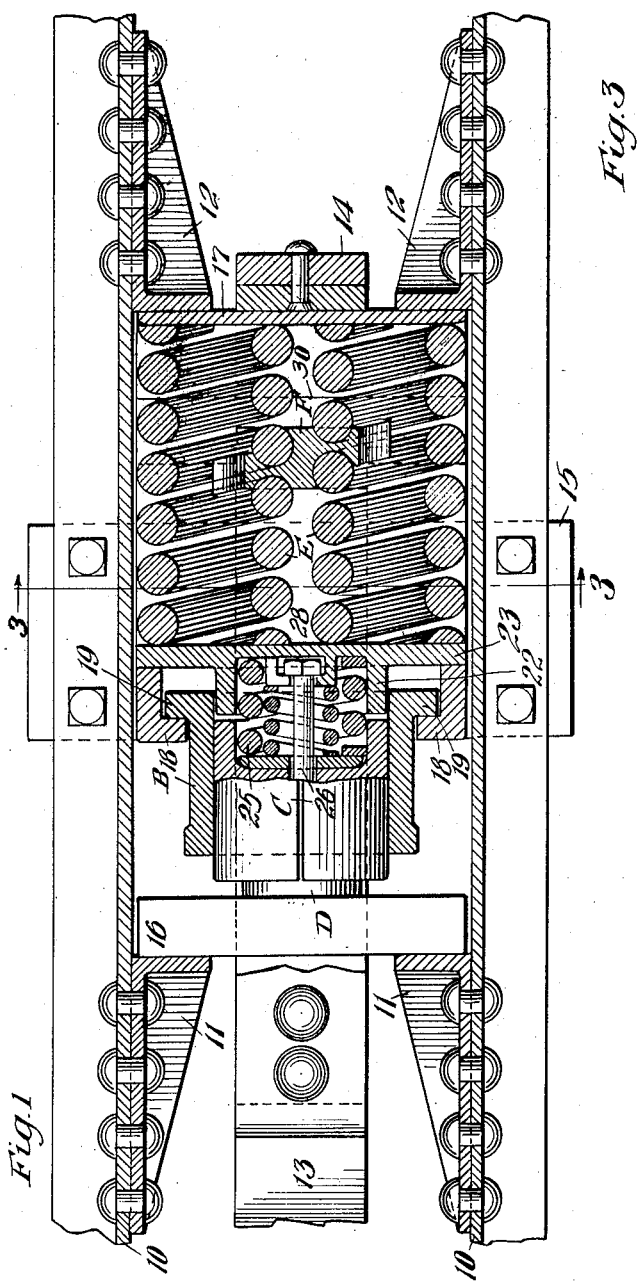
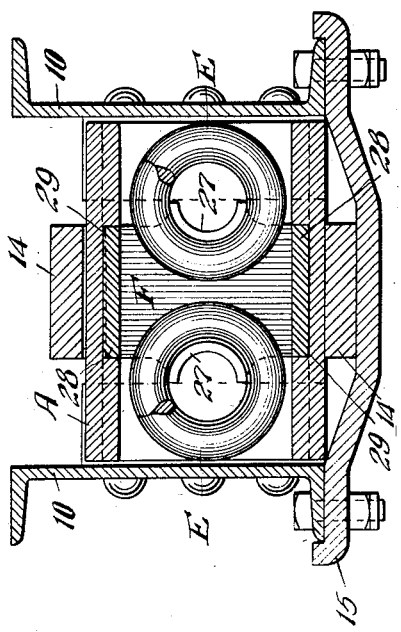
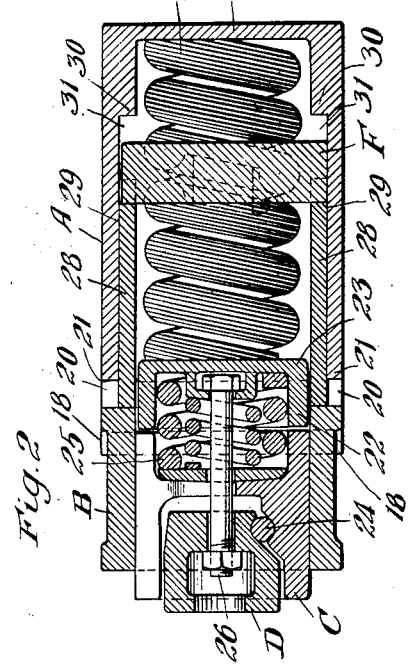
Inventor
John F. O'Connor
By George I. Haight
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBING MECHANISM.

1,407,882.  Specification of Letters Patent.  Patented Feb. 28, 1922.

Application filed September 30, 1918. Serial No. 256,171.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbing Mechanism, of which the following is a full, clear, concise, and exact description, reference being had to the accompanying drawings, forming a part of this specification.

This invention relates to improvements in shock absorbing mechanism.

Heretofore, in the art of shock absorbing mechanisms and more particularly in railway draft gears, it has been customary to provide a friction gear having a preliminary spring action for a predetermined portion of the compressive stroke. The object of providing a shock absorbing mechanism of this character is, of course, to give a graduated easy action, particularly on passenger equipment. By employing a preliminary spring action, all ordinary small shocks are readily absorbed without complete actuation of the mechanism and unusual or excessive heavy shocks can be taken care of in a final friction action.

In providing for the preliminary spring action above referred to, it has been customary to employ one of three expedients. In some forms of mechanisms, a relatively small capacity independent preliminary spring has been used which is compressed solid during the preliminary action and thereafter the friction elements come into play against the action of the so-called heavier main spring. With this arrangement, the capacity obtained from the small preliminary spring is quite small and insufficient for average conditions and also the change from the preliminary spring to the friction action represents a comparatively large sudden increase which militates against a smooth graduated action for the entire stroke.

A second expedient has been to employ the main springs to perform both the work of the preliminary action and the friction action. With these arrangements, the parts are so designed that the main spring of the gear is compressed for a certain predetermined distance without actuation of the friction elements and thereafter the friction elements are actuated so as to take up the remainder of the compressive action of the main spring. These arrangements present certain objections for the following reasons: The average capacity of standard springs employed in railway draft gears is 30,000 pounds, static, and the springs are given 2 or 2½ inches of compression. It is evident that a spring having an ultimate static capacity of 30,000 pounds will only yield a portion of that ultimate capacity if the entire spring is only partially compressed. In other words, a spring having an ultimate capacity of 30,000 pounds with a 2" movement, will yield only, say, 15,000 pounds if compressed for only one inch. Consequently, the preliminary spring capacity of these arrangements is likewise insufficient and the change from spring to friction action too abrupt as in the devices mentioned in the preceding paragraph.

A third method heretofore used involves the use of main springs formed in independent sections, each section being made of the usual size wire and each section having the required ultimate capacity of, say, 30,000 pounds. With this method, the preliminary action is applied to one independent section of the spring and the required preliminary spring capacity obtained. In the subsequent friction action, the other independent section of the spring is brought into play and compressed. The last described arrangement gives the desired preliminary spring capacity and eliminates the abrupt change from mere spring to a friction action but is nevertheless open to objection because of the unnecessary waste involved in the inactive portions of the springs.

One object of my invention is to provide an arrangement for employing springs of shock absorbing mechanisms in such a manner that any desired portion of the spring can be utilized during a preliminary spring action with a minimum loss in the inactive portions of the spring while at the same time obtaining a preliminary spring capacity equal to the ultimate static capacity of the spring being employed.

Another object of the invention is to provide a shock absorbing mechanism more particularly adapted for railway draft riggings wherein I obtain a preliminary spring action by using the main springs of the mechanism intact, the preliminary spring capacity reaching the capacity of the main springs, the main springs being also utilized to resist final relative movement between the friction elements and friction shell.

Other objects of the invention will more fully appear from the description hereinafter following.

In the drawings forming a part of this specification, Figure 1 is a horizontal, longitudinal, sectional view of a portion of a railway draft rigging showing my improvements in connection therewith. Fig. 2 is a vertical, longitudinal section of the shock absorbing mechanism proper illustrated in Fig. 1. And Fig 3 is a vertical, transverse, sectional view taken substantially on the line 3—3 of Fig. 1.

In said drawings 10—10 denote channel shaped center or draft sills of a railway car to the inner faces of which are secured front stop lugs 11—11 and rear stop lugs 12—12. The draw bar of the draft rigging indicated at 13 is operatively connected to the shock absorbing mechanism by any suitable means such as the yoke 14 and all the parts are supported by a detachable saddle plate 15. A front follower 16 is shown interposed between the draw bar and the shock absorbing mechanism proper.

The shock absorbing mechanism, as shown, comprises a spring casing A, a friction shell B, a series of friction shoes C—C, a wedge D, twin arranged main springs E—E, and other details hereinafter specifically referred to.

The spring casing A is of generally rectangular formation with open sides thereby adapting the main springs E—E to be inserted laterally in a well known manner. The casing A is formed at its rear end with an integral transverse wall 17 which acts as the rear follower for the draft rigging. At its front end, the casing A is centrally apertured to accommodate the substantially cylindrical friction shell B. On each side of said central aperture, the casing A is formed with vertically extending inturned flanges 18—18, with which cooperate laterally extended flanges 19—19 on the shell B to limit the outward movement of the shell with respect to the casing. The casing A is also cut away in its top and bottom walls, as indicated at 20—20 in Fig. 2, to accommodate the rear edge portions of the shell B and permit the latter to move rearwardly with respect to the casing A until it engages with the shoulders 21—21 formed on the latter. As will be understood, the shell is assembled with the casing by slipping the shell vertically with respect to the casing as the parts are viewed in Fig. 2. When in proper position, the shell is prevented from accidental disengagement with the casing A by an annular flange 22 formed on the forward side of a spring follower 23 which is mounted within the casing and has the flange 22 thereof extending within the shell, as clearly illustrated in Figs. 1 and 2.

The friction shoes C are preferably three in number and arranged circularly in a well known manner. The wedge D is extended within the shoes and anti-friction rollers 24 are preferably interposed between the wedge and the shoes. A light spring 25 is interposed between the shoes and the follower 23, there being a slight clearance left between the flange 22 of the follower and the shoes in order that the spring 25 may be effective to maintain all the friction elements in tight engagement with each other and compensate for wear. To carry out this result, a retaining bolt 26 is used having its head detachably engaged with the follower 23 and a nut applied thereto within the wedge D. For practical purposes, the clearance between the shoes and the flange 22 may be neglected in considering the compressive action of the gear. This clearance will be very small and in actual practice, merely sufficient to permit the spring 25 to perform its necessary function.

In order to carry out one of the objects of my invention, I employ a diaphragm designated generally by the reference F. This diaphragm is in the form of a block extending between the twin springs E—E. The block is provided on each side thereof with extensions 27 interposed between and fitting two adjacent coils of one of the springs E. As will be understood, the extensions 27 are given a pitch similar to the pitch of the coiled springs E. The extensions 27 may be of any desired length circumferentially but are preferably made slightly less than one-half the circumference of a coil of the spring, as shown most clearly in Fig. 3. Cooperable with the diaphragm F is a pair of thrust or pressure-transmitting bars 28—28 slidably mounted in corresponding grooves or guideways 29—29 in the upper and lower walls of the casing A, as clearly indicated in Fig. 3. The thrust bars 28, at their outer ends, engage with the inner end of the shell B and said bars at their inner ends engage the diaphragm F, as shown most clearly in Fig. 2. On the interior of the casing A, suitable shoulders are formed at the inner end thereof, as indicated at 30—30 with which the diaphragm F is adapted to contact as hereinafter explained. The diaphragm and springs are inserted laterally when the diaphragm is so positioned on the springs that it comes opposite the cross channels 31—31 after which the springs can be rotated to move the diaphragm thereon.

The operation is as follows, assuming that the mechanism is operated under buff and omitting consideration of the slight movements which will occur between the friction elements and the follower 23 to take up the space between the flange 22 and the friction shoes. As pressure is applied from the draw bar through the follower 16 to the wedge of the friction device, the shell, friction shoes, wedge, spring 25 and follower 23 will move rearwardly as an entirety until the shell B engages with the shoulders 21 of the casing A. During this preliminary movement there will be no relative movement between the elements of the friction device and the pressure from the shell B will be transmitted to the diaphragm F through the thrust bars 28. This pressure is then applied through the diaphragm F to the springs E at the points where the diaphragm F engages the springs E and consequently only those portions of the springs E rearwardly of the diaphragm F will be compressed, it being evident that the portions of the springs E between the diaphragm F and the follower 23 will float idly without compression during the preliminary action. The preliminary action may be made of any desired extent which in ordinary practice will amount to approximately one inch. The diaphragm F will be so placed on the springs E that the portions compressed during the preliminary action will be compressed to their full extent or substantially solid. In actual practice, the shell B will contact with the casing A at the same time that the diaphragm F engages the shoulders 30 so as to avoid possible injury to the rear portions of the springs E which might result from over-compression. After the preliminary action above described, the shell B will, of course, remain stationary and further pressure will cause the friction shoes and wedge to move relatively to the shell B. This relative movement is resisted by the portions of the springs E which are forward of the diaphragm F and which have theretofore remained uncompressed. The action under draft will be similar to that above described except, of course, the direction of movement of the various parts is reversed.

By adopting the arrangement above described, it will be observed that I obtain a capacity during the preliminary action equal to the capacity of the springs E, that is, if each spring E has a static capacity of thirty thousand pounds, by my arrangement I will obtain a preliminary spring capacity of sixty thousand pounds since I compress to their full extent, those portions of the springs which are employed during the preliminary action. When the action of the mechanism changes from the preliminary spring to the friction, it is evident that there will be no abrupt jump in the capacity since the preliminary spring capacity has reached approximately sixty thousand pounds. It will further be noted that with my arrangement, the diaphragm F can be adjusted within certain limits lengthwise of the springs E by merely rotating the latter, thereby adapting my improvements to mechanisms having preliminary movements of different degrees. In the event it is not desired to obtain a preliminary spring capacity equal to the full static capacity of the springs, the diaphragm F can be shifted so as to bring a different length of the springs into action during the preliminary movement and allow those portions to be only partly compressed. The arrangement premits great flexibility without changing the construction of any of the parts.

Although I have herein shown and described what I now consider the preferred manner of carrying out the invention, the same is merely illustrative and I contemplate all changes and modifications that come within the scope of the claims appended hereto.

I claim:

1. In a shock absorbing mechanism, the combination with a friction shell and a plurality of friction elements including a wedge cooperable with the shell; of a coiled spring arranged to resist relative movement between said shell and elements and disposed entirely to one side of said elements; and means for obtaining a preliminary spring action by utilization of a part only of the coils of said spring.

2. In a shock absorbing mechanism, the combination with a friction device including a friction shell and friction elements cooperable therewith, said elements being adapted for movement relatively to the shell; of a spring; and means interposed between said device and a portion of said spring adapted to apply compressive pressure to a part only of said spring for a predetermined preliminary action when pressure is applied to said device, the balance of said spring being adapted to thereafter yieldingly resist relative movement between said shell and the elements of said friction device.

3. In a railway draft rigging, the combination with draft sills, stop acting means, front and rear follower acting means, and a friction device including a friction shell and friction elements cooperable therewith; of a spring interposed between said device and one of said follower acting means and having one of its ends bearing against said follower acting means; of means for transmitting pressure from said friction device to a point intermediate the ends of said spring when pressure is applied to said device to move it relatively toward said follower acting means against which the spring bears to thereby compress a part only of said spring while the friction device is moved as an entirety for a preliminary spring action, the friction elements of said friction device being thereafter movable relatively to the friction shell and resisted by the remaining portion of said spring.

4. In a device of the character described, the combination with a spring, of a member against which one end of said spring is adapted to bear while the spring is being compressed, means for transmitting pressure in a direction toward said member, and devices interposed between said means and an intermediate point on said spring and engaging the latter to thereby compress only that part of said spring between the point of application of the pressure thereto and said member.

5. In a device of the character described, the combination with a spring, of a member against which one end of said spring is adapted to bear while the spring is being compressed, means for transmitting pressure in a direction toward said member, and devices interposed between said means and an intermediate point on said spring and engaging the latter to thereby compress only that part of said spring between the point of application of the pressure thereto and said member, said device including an element adjustable lengthwise with respect to said spring to thereby vary the point of application of pressure thereon.

6. In a device of the character described, the combination with twin arranged springs, of a member against which corresponding ends of said springs are adapted to bear while the springs are being compressed, means for transmitting pressure in a direction toward said member, a diaphragm extending between said springs and having contact with coils thereof, said diaphragm being adjustable lengthwise of said springs, and devices interposed between said means and said diaphragm for transmitting pressure from said means through said diaphragm to said springs at points intermediate the ends thereof.

7. In a shock absorbing mechanism, the combination with a spring casing; of a friction shell movable for a predetermined distance relatively to said casing; friction elements cooperable with said shell; twin arranged springs within said casing and interposed between one end of the latter and the friction shell; a diaphragm extending between said springs and located intermediate the ends thereof; and pressure-transmitting means interposed between said shell and said diaphragm adapted to move the latter in unison with said shell relatively to the casing.

In witness that I claim the foregoing I have hereunto subscribed my name this 18th day of Sept., 1918.

JOHN F. O'CONNOR.